United States Patent
Kliesch et al.

(10) Patent No.: US 7,285,322 B2
(45) Date of Patent: *Oct. 23, 2007

(54) MULTILAYER, TRANSPARENT FILM MADE FROM POLYETHYLENE TEREPHTHALATE (PET) AND POLYETHYLENE NAPHTHALATE (PEN) FOR PRODUCING PACKAGING COMPOSITES WITH UV PROTECTION

(75) Inventors: Holger Kliesch, Mainz (DE); Thorsten Kiehne, Wiesbaden (DE); Bart Janssens, Wiesbaden (DE); Christine Schmiedeskamp, Wiesbaden (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/462,337

(22) Filed: Jun. 16, 2003

(65) Prior Publication Data

US 2003/0235701 A1    Dec. 25, 2003

(30) Foreign Application Priority Data

Jun. 20, 2002  (DE) .............................. 102 27 442

(51) Int. Cl.
*B32B 7/02* (2006.01)
*B32B 15/09* (2006.01)
*B32B 27/08* (2006.01)
*B32B 27/18* (2006.01)
*B32B 27/36* (2006.01)

(52) U.S. Cl. .................... 428/212; 428/35.7; 428/36.6; 428/323; 428/328; 428/480; 428/483; 428/457; 428/458; 428/474.4; 428/475.2; 428/475.5; 264/288.4; 264/290.2

(58) Field of Classification Search ................ 428/480, 428/916, 212, 483, 475.2; 264/288.4, 290.2
See application file for complete search history.

(56) References Cited

U.S. PATENT DOCUMENTS

| | | | | |
|---|---|---|---|---|
| 4,375,494 A * | 3/1983 | Stokes ..................... 428/323 |
| 4,604,257 A * | 8/1986 | Smith et al. .................. 264/513 |
| 4,883,706 A * | 11/1989 | Grosjean .................... 428/215 |
| 5,073,435 A * | 12/1991 | Eyraud et al. ............... 428/215 |
| 5,102,734 A * | 4/1992 | Marbrow et al. ........... 428/349 |
| 5,164,248 A * | 11/1992 | Fleury et al. ............... 428/220 |
| 5,215,825 A * | 6/1993 | Hiraoka et al. ............. 428/480 |
| 5,292,471 A * | 3/1994 | Ito et al. .................. 264/173.16 |
| 5,310,857 A * | 5/1994 | Jones et al. .................. 528/220 |
| 5,328,755 A * | 7/1994 | Mills et al. ................. 428/215 |
| 5,391,701 A * | 2/1995 | Jones et al. .................. 528/298 |
| 5,458,965 A * | 10/1995 | Yoshinaka et al. .......... 428/323 |
| 5,651,926 A * | 7/1997 | Kido et al. .................... 264/21 |
| 5,895,807 A * | 4/1999 | Galko et al. ................. 525/444 |
| 5,912,307 A * | 6/1999 | Paschke et al. ............. 525/444 |
| 5,955,181 A * | 9/1999 | Peiffer et al. ................ 428/212 |
| 6,054,212 A * | 4/2000 | Peiffer et al. ................ 428/336 |
| 6,149,995 A * | 11/2000 | Peiffer et al. ............... 428/35.8 |
| 6,291,053 B1 * | 9/2001 | Peiffer et al. ................ 428/141 |
| 6,428,882 B1 * | 8/2002 | Peiffer et al. ................ 428/220 |
| 6,503,549 B1 * | 1/2003 | Mueller ....................... 426/396 |
| 6,534,169 B2 * | 3/2003 | Pfeiffer et al. .............. 428/336 |
| 6,537,647 B2 * | 3/2003 | Peiffer et al. ................ 428/141 |
| 6,565,936 B1 * | 5/2003 | Peiffer et al. ............... 428/35.9 |
| 6,607,823 B2 * | 8/2003 | Posey et al. ................. 428/336 |
| 6,613,819 B2 * | 9/2003 | Johnson et al. ............. 524/100 |
| 6,773,104 B2 * | 8/2004 | Cornelius et al. ........... 347/106 |
| 6,852,388 B2 * | 2/2005 | Murschall et al. .......... 428/141 |
| 2001/0009722 A1 | 7/2001 | Scott et al. .................. 428/480 |
| 2002/0039646 A1 * | 4/2002 | Peiffer et al. ................ 428/216 |
| 2002/0041437 A1 * | 4/2002 | Cornelius ................... 359/361 |
| 2002/0090498 A1 * | 7/2002 | Peiffer et al. ................ 428/216 |
| 2002/0102399 A1 * | 8/2002 | Peiffer et al. ................ 428/336 |
| 2003/0113562 A1 * | 6/2003 | Bartsch et al. .............. 428/480 |
| 2003/0235703 A1 * | 12/2003 | Kliesch et al. .............. 428/480 |

FOREIGN PATENT DOCUMENTS

| | | |
|---|---|---|
| DE | 33 00 411 A1 | 7/1983 |
| DE | 26 44 209 A1 | 5/1997 |
| DE | 197 20 505 A1 | 11/1998 |
| EP | 0 839 854 A1 | 5/1977 |
| EP | 0 849 075 A2 | 6/1998 |
| EP | 0 903 222 A2 * | 3/1999 |
| EP | 1 179 418 A2 | 2/2002 |
| GB | 1 444 163 A | 7/1976 |
| GB | 2 228 940 * | 9/1990 |
| GB | 2 344 596 A | 6/2000 |
| JP | 11 227840 A1 | 8/1999 |
| WO | WO 95/17303 A1 | 6/1995 |
| WO | WO 96/35571 A1 | 11/1996 |
| WO | WO 93/23723 A1 | 9/1997 |
| WO | WO 93/23724 A1 | 9/1997 |
| WO | WO 93/23725 A1 | 9/1997 |
| WO | WO 01/96107 A2 | 12/2001 |
| WO | WO 01/96114 A1 | 12/2001 |

OTHER PUBLICATIONS

Schimtz, Peter et al., "Films." Ullmann's Encyclopedia of Industrial Chemistry, 5th Ed., vol. A11 (1988), pp. 85-95, 108-110.*

* cited by examiner

Primary Examiner—Vivian Chen
(74) Attorney, Agent, or Firm—ProPat, L.L.C.

(57) ABSTRACT

The invention relates to an at least two-layer polyester film with a total thickness of from 5 to 200 μm which comprises, alongside polyethylene terephthalate, from 2 to 20% by weight—based on the weight of the entire film—of polyethylene naphthalate (PEN), where at least one outer layer comprises less than 0.1% by weight of PEN (based on the weight of this outer layer).

16 Claims, No Drawings

MULTILAYER, TRANSPARENT FILM MADE FROM POLYETHYLENE TEREPHTHALATE (PET) AND POLYETHYLENE NAPHTHALATE (PEN) FOR PRODUCING PACKAGING COMPOSITES WITH UV PROTECTION

The invention relates to an at least two-layer, transparent film with reduced permeability to UV radiation. The film comprises terephthalic acid units and also naphthalenedicarboxylic acid units, at least one outer layer here comprising less than 0.1% of PEN. The invention further relates to a process for producing this film, and to its use in packaging composites with extended shelf life.

BACKGROUND OF THE INVENTION

Parameters important for the suitability of a film for the packaging of perishable goods are the oxygen barrier and also, in the case of transparent packaging, the permeability of the film to UV (the ultraviolet portion of light). The second item is particularly important in the case of foods, for example those presented in supermarket counters which are subject to irradiation by lamps with relatively high UV emission. If the UV permeability of the packaging here is too high the result can be unattractive discoloration and changes in taste.

A particularly important third criterion for the suitability of a packaging film is its price, since even relatively small price differences can shift the purchasing decision in the direction of a more favored product, even if the packaging does not meet high quality requirements with regard to durability.

The polyester-based packaging films currently available in the market are almost exclusively PET—(polyethylene terephthalate)-based films, such as Hostaphan® RNK (Mitsubishi Polyester Film GmbH, Wiesbaden). Although these films are low-priced and generally have an acceptable oxygen barrier for many applications, this barrier is nevertheless often inadequate, in particular for transparent, unmetallized packaging. In addition, PET retains relatively high permeability to UV light.

Films made from PEN (polyethylene naphthalate) provide a substantially higher oxygen barrier and also have lower UV permeability, but are uneconomic due to the high price of PEN and are therefore little used in industry.

Although this problem can be reduced to some extent by using multilayer films which comprise one or more PEN layers on a PET base (e.g. DE-A-197 20 505 or WO 01/96114), these films have problems with delamination of the layers made from the different polyesters and are relatively difficult to produce. In addition, the regrind arising cannot subsequently be reused for a product of the same value, since PET and PEN become mixed during the regrinding process and can therefore no longer be utilized to produce the high-value layers comprising 100%, or almost 100% by weight, of PEN. The material can only replace the comparatively inexpensive PET. For these reasons, although these films are less expensive than films composed mainly of PEN they are considerably more expensive than standard PET packaging films, and are therefore used only in niche markets with particular requirements.

Films made from blends of PET and PEN have also been described (e.g. GB 2 344 596), but here there is no indication as to how these blends can be used to produce a film with improved UV barrier and oxygen barrier, capable of being used to produce transparent packaging with increased shelf life. Nor are there any indications of the quantitative PET/PEN ratios suitable for producing films with good oxygen barrier and UV barrier.

Another very general method for improving the UV permeability of polyester films is to add UV stabilizers/absorbers e.g. Tinuvin® (Ciba Speciality Chemicals, Switzerland). However, the use of these compounds is likewise accompanied by relatively high costs, and, depending on the stabilizer used, creates problems with suitability for direct contact with foods.

Packaging made from PEN copolymers or from PET/PEN copolymers (or blends) also has very high blue fluorescence intensity when it is irradiated with UV light. In the case of PET/PEN copolymers with low PEN content of <5%, this intensity is indeed even higher than for straight PEN. While slight blue fluorescence can indeed be desirable to eliminate a yellow tinge in the film, strongly clearly visible blue fluorescence makes the contents appear unnatural (artificial), and this can adversely affect the consumer's purchasing decision. This fluorescence should therefore be minimized.

An object of the present invention was then to provide a film which, when compared with straight PET films, provides a better oxygen barrier and UV barrier, can be produced at low cost and is suitable for packaging applications, and, when compared with packaging comprising PET films, ensures an improved lifetime for the packaged goods, even at relatively high UV doses. In addition, the film or the packaging produced therefrom should not have any tendency toward particularly strong blue fluorescence when irradiated with UV light.

BRIEF DESCRIPTION OF THE INVENTION

This is achieved by way of an at least two-layer polyester film with a total thickness of from 5 to 200 µm, preferably from 6 to 50 µm, and particularly preferably from 8 to 14 µm which comprises, alongside polyethylene terephthalate (PET), based on the weight of the entire film, from 2 to 20% by weight, preferably from 4 to 16% by weight, and particularly preferably from 6 to 12% by weight, of polyethylene naphthalate (PEN), where at least one outer layer comprises, based on the weight of this outer layer, less than 0.1% by weight of PEN, preferably less than 0.05% by weight, and particularly preferably 0% by weight of PEN (this layer also being termed PEN-free layer below).

DETAILED DESCRIPTION OF THE INVENTION

The invention also provides packaging which is produced from these polyester films. Apart from the restriction for at least one outer layer, the distribution of the polyethylene naphthalate across the individual layers of the film is not important. However, it has proven advantageous for the content of polyethylene naphthalate in each layer not to exceed 25% by weight, since otherwise the film may not have sufficient crystallizability or orientation (an exception being sealable films, the sealable layer of which may comprise more than 25% by weight of PEN).

Surprisingly, the low PEN contents of the invention are sufficient to extend markedly the lifetime of foods packed using these films—when comparison is made with packaging made from conventional PET films—either when the film is produced from mixtures of PET chips and PEN chips (block copolymers) or when random copolymers are used. The improvement achievable here depends on the amount of PEN and on the thickness of the film. For example, for a film of thickness from 50 to 200 µm it is sufficient to use from 3 to 8% by weight of PEN in order to prevent discoloration of the packed meat or other contents during storage for one month under the UV intensities prevailing in conventional refrigerated counters in supermarkets. From 5 to 16% by weight of PEN are needed for similarly good results in films of from 8 to 24 µm. The films of the invention have transmittance at 330 nm of less than 25% and preferably less than 10%. At 350 nm the films of the invention have transmittance of less than 25% and preferably less than 10%.

PEN concentrations higher than the range of the invention reduce, and finally eliminate, the tendency toward crystallization. This leads in turn to a markedly lower oxygen barrier and water-vapor barrier. For achievement of an adequate oxygen barrier of less than 110 $\{cm^3/(m^2 \cdot d \cdot bar)\} \cdot \{film\ thickness\ [µm]/12\ [µm]\}$ or preferably less than 100 $\{cm^3/(m^2 \cdot d \cdot bar)\} \cdot \{film\ thickness\ [µm]/12\ [µm]\}$ and particularly preferably less than 95 $\{cm^3/(m^2 \cdot d \cdot bar)\} \cdot \{film\ thickness\ [µm]/12\ [µm]\}$ it is therefore also advantageous for there to be at least one melting peak between 230 and 270° C., and preferably between 240 and 265° C. on the DSC (digital scanning calorimeter) under the conditions described under Test methods.

For achievement of the barrier mentioned it is also advantageous for the PEN concentration of the film to be at least 5% by weight.

Surprisingly, it has also been found that the blue fluorescence can be avoided or markedly reduced if the arrangement of the film in the packaging—mostly a laminate made from the film of the invention, for example, polyethylene, polypropylene, or the like—is such that its PEN-free outer layer faces toward the incident light.

Alongside the inventive proportions mentioned of PEN, the film of the invention comprises PET, i.e. polyethylene terephthalate, as main constituent. Alongside terephthalic acid (TPA) and 2,6-naphthalenedicarboxylic acid (NDA) as monomers, the film may comprise from 0 to 20% by weight, preferably from 0.5 to 2.5% by weight, of isophthalic acid, and in this context it has surprisingly been found that from 0.5 to 2.5% by weight content of isophthalic acid (IPA) gives a further improvement of from 2 to 5% in the oxygen barrier. Of course, the dimethyl esters of the dicarboxylic acids mentioned are also suitable monomers, as well as the acids themselves. The proportion of other dicarboxylic acids or dimethyl esters, e.g. 1,5-naphthalenedicarboxylic acid, should not exceed 6% by weight, preferably 2% by weight.

The main monomer of the diol component is ethylene glycol (EG). In contrast to the positive effect mentioned of IPA, the oxygen barrier reduces with rising diethylene glycol (DEG) content. The proportion of DEG should therefore not exceed 3% by weight and is ideally from 0.5 to 1.5% by weight. The proportion of other comonomer diols, e.g. cyclohexanedimethanol, 1,3-propanediol, 1,4-butanediol, should not exceed 5% by weight and is preferably less than 3% by weight. All of these data, like the PEN content, are based on the total weight of the film. Depending on functionality, the functional outer layers considered separately comprise other contents of monomers.

The film of the invention has at least two layers. For the purposes of the invention preference is given to structures made from a PEN-containing layer (base layer (B)) and from at least one PEN-free outer layer (outer layer (A)). Preference is also given to films with a PEN-containing base layer (B) and two PEN-free outer layers (A) and (A'). Preference is also given to films with a PEN-containing base layer (B) and with a PEN-free outer layer (A) and another outer layer (C) on that side of the base layer opposite to (A). In preferred embodiments, this layer (C) has an additional functionality. Examples of this functionality are sealability, gloss, or mattness. In one preferred embodiment, the functional layer C is sealable. Preference is also given to structures made from a PEN-containing layer and from a PEN-free base layer which then is also the outer layer.

The thickness of the outer layer(s) is selected without reference to the other layers and is preferably in the range from 0.1 to 10 µm, in particular from 0.2 to 5 µm, with preference from 0.3 to 2 µm, and it is possible here for the thickness and composition of outer layers applied on the two sides to be identical or different. The thickness of the base layer is then calculated by taking the difference between the total thickness of the film and the thickness of the outer and intermediate layer(s) applied, and, like the total thickness, can therefore vary within wide limits. The base layer is generally either the thickest of all of the layers present or the innermost layer. The base layer can also be an "outer layer" but only insofar as there is/are no other outer layer(s) on one or both surfaces of this base layer.

The PEN-free outer layer (A) advantageously comprises particles. The concentration of particles in this layer is from 0.005 to 10.0% by weight, advantageously from 0.12 to 0.8% by weight, and in particular from 0.15 to 0.6% by weight. Examples of particles which may be used are inorganic particles, such as kaolin, talc, $SiO_2$, $MgCO_3$, $CaCO_3$, $BaCO_3$, $CaSO_4$, $BaSO_4$, $Li_3PO_4$, $Ca_3(PO_4)_2$, $Mg_3(PO_4)_2$, $TiO_2$, $Al_2O_3$, MgO, SiC, LiF, or the Ca, Ba, or Mn salts of terephthalic acid. However, it is also possible to add particles based on crosslinked, non-melting, organic polymers, e.g. polystyrenes, polyacrylates, polymethacrylates.

The sealable outer layer (C) applied by coextrusion to the base layer B in one preferred embodiment advantageously has a structure based on polyester copolymers. For the purposes of the invention, preference is given here to two variants:

a: copolyester made from terephthalic acid and isophthalic acid
b: copolyester made from terephthalic acid and naphthalenedicarboxylic acid Version a:

The sealable outer layer is substantially composed of copolyesters composed mainly of isophthalic acid units and of terephthalic acid units and of ethylene glycol units. The remaining monomer units derive from those other aliphatic, cycloaliphatic, or aromatic diols or, respectively, dicarboxylic acids which may also be present in the base layer. The preferred copolyesters which provide the desired sealing properties are those whose structure has ethylene terephthalate units and ethylene isophthalate units. The proportion of ethylene terephthalate is from 40 to 95 mol %, and the corresponding proportion of ethylene isophthalate is from 60 to 5 mol %. Preference is given to copolyesters in which the proportion of ethylene terephthalate is from 50 to 90 mol % and the corresponding proportion of ethylene isophthalate is from 50 to 10 mol %, and great preference is given to copolyesters in which the proportion of ethylene terephthalate is from 60 to 85 mol %, and the corresponding proportion of ethylene isophthalate is from 40 to 15 mol %.

Version b:

The sealable outer layer is substantially composed of copolyesters mainly composed of naphthalenedicarboxylic acid units and of terephthalic acid units and of ethylene glycol units. The remaining monomer units derive from those other aliphatic, cycloaliphatic, or aromatic diols or, respectively, dicarboxylic acids which may also be present in the base layer. The preferred copolyesters which provide the desired sealing properties are those whose structure has ethylene terephthalate units and ethylene haphthalate units. The proportion of ethylene terephthalate is from 30 to 75 mol %, and the corresponding proportion of ethylene naphthalate is from 70 to 25 mol %. Preference is given to copolyesters in which the proportion of ethylene terephthalate is from 40 to 60 mol %, and the corresponding proportion of ethylene isophthalate is from 40 to 60 mol %.

If the content of PEN in the sealable layer is not sufficient to achieve the inventively significant total PEN content of the film, the balancing PEN content should be added to the base layer, and a PEN-free outer layer has to be applied.

Versions a and b may be combined with one another. This can reduce the minimum amounts of isophthalic acid and, respectively, PEN. However, for PET/PEN/IPA sealable layers it has proven advantageous for the PEN content of the sealable layer (C) to be at least 15% by weight, and for the isophthalic acid content to be at least 5% by weight.

The polyesters may be prepared either by the transesterification process, using the usual catalysts, e.g. Zn salts, Ca salts, Li salts, or Mn salts, or by the direct esterification process.

Where appropriate, the polyester for each layer comprises the abovementioned conventional additives (particles). The concentration of the particles used is preferably from 0.005 to 10.0% by weight, particularly preferably from 0.01 to 0.5% by weight. The average particle size is from 0.001 to 10 µm, preferably from 0.005 to 3 µm.

The standard viscosity SV (DCA) of the polyester used, measured in dichloroacetic acid to DIN 53728, is advantageously from 400 to 1200, preferably from 700 to 900.

In one preferred embodiment, the PEN content or some of the PEN content is introduced to the film by feeding regrind (=polymer produced from production waste) from another PEN application (i.e. film production in which another PEN-containing film is produced for another use). This may, for example, be regrind from PEN capacitor film production (generally 100% by weight of PEN), or particularly preferably regrind from an application which, as mentioned at the outset, uses one or more PEN layers on a PET base. When this type of regrind is used the material has been found to give particularly reliable running, since the prior mixing of PET and PEN here gives better stretching capability. If straight PEN regrind is used, it has proven advantageous for this not to be solid-phase-condensed—as is otherwise usual prior to reuse. Besides this foreign regrind, the film also comprises up to 65% by weight of self-regrind or regrind from other PET film applications, and it has proven advantageous here for stability of the process for the film to comprise at least 20% by weight of self-regrind (since there is then particularly good mixing of PET/PEN).

The invention also provides a process for producing the polyester film of the invention by the extrusion or coextrusion process known per se.

The procedure for this process is that the melts corresponding to the individual layers of the film are coextruded through a flat-film die, the resultant film is drawn off on one or more rolls for solidification, and the film is then biaxially stretched (oriented), and the biaxially stretched film is heat-set and, where appropriate, corona- or flame-treated on the surface intended for treatment.

The biaxial stretching is generally carried out sequentially. It is preferable here to begin with longitudinal stretching (i.e. in machine direction=MD) and follow this by transverse stretching (i.e. perpendicularly to machine direction=TD). This leads to orientation of the molecular chains of the polyester. The longitudinal stretching preferably takes place with the aid of two rolls rotating at different speeds corresponding to the desired stretching ratio. For the transverse stretching, a general method is to utilize an appropriate tenter frame.

The temperature at which the stretching is carried out may vary over a relatively wide range, and depends on the desired properties of the film. The longitudinal stretching is generally carried out at from 80 to 130° C., preferably at from 90 to 120° C., particularly preferably at from 100 to 110° C., and the transverse stretching at from 90 to 150° C., preferably at from 90 to 120° C., particularly preferably at from 100 to 110° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

The stretching may also take place in a simultaneous stretching frame (simultaneous stretching), the number of stretching steps and the sequence (longitudinal/transverse) here not being of decisive importance for the property profile of the film. The stretching ratios are those found in the conventional sequential process.

In the heat-setting which follows, the film is held for from about 0.1 to 10 s, at a temperature of from 150 to 250° C., preferably from 190 to 240° C., particularly preferably from 210 to 230° C. The film is then cooled and then wound up in the usual way. However, prior to winding up the film may also be chemically treated or else corona- or flame-treated to establish other desired properties. The intensity of treatment is set in such a way as to give the treated film a surface tension greater than or equal to 45 mN/m.

The film may also be coated to establish other properties. Typical coatings are those with adhesion-promoting, antistatic, slip-improving, or release action. Clearly, these additional layers may be applied to the film via in-line coating, using aqueous dispersions, after longitudinal stretching and prior to transverse stretching.

In another embodiment for applications with particularly high barrier requirements, the film is given a vapor-deposited coating of a metal (semimetal) oxide layer, e.g. $Al_2O_x$ or $SiO_x$.

The film composite finally used for packaging purposes comprises, besides the film of the invention (=film I), depending on the use, other films (=film II), for example films made from PET or made from an oriented polyamide (oPA), or polyethylene (PE) sealable films or polypropylene (PP) sealable films. The film or the composite may also have been coated with a sealable layer, for example of PP or PE, to control sealing properties. Preferred methods for combining the individual films to give a film composite use laminating adhesives, e.g. those based on polyurethane.

The packaging finally used is therefore composed either of the composite sealed to itself (bag packaging) or of the composite applied as "lid" to a substrate (tray). In the case of the second possibility, it is to be noted that the tray, if it is transparent, should also have low UV permeability, achievable by using the film of the invention applied by lamination, for example. Transparent laminates or composites are described by way of example in DE-A-33 00 411 and DE-A-26 44 209.

The total thickness of the inventive composite film, which is composed at least of the inventive film I and of a film II, may vary within wide limits and depends on the application. The inventive composite films preferably have a thickness in the range from 9 to 1200 µm, in particular from 10 to 1000 µm, particularly preferably from 20 to 800 µm.

The film II of the inventive composite film may be a thermoplastic film and/or a standard thermoplastic film, and/or a polyolefin film, and/or the inventive film I. This second film is preferably applied to that side of the film I which has additional functionality ($SiO_x$ coating, corona treatment, and/or flame treatment, and/or adhesion promoter, and/or copolyester, and/or $Al_2O_x$ coating, and/or printing inks, to mention just a few functionalities), but may also be applied to that side of the film which has no functionality.

The film II may have one or more layers and, like film I, may have been oriented by stretching, and may have at least one sealable layer. The second film may have been bonded to film I of the invention with or without adhesive.

The thickness of this film II is generally from 4 to 700 µm.

The composite films are generally obtained by laminating at least the films I and II used to one another with or without an adhesive layer therebetween, by passing these between rolls temperature-controlled to from 30 to 90° C.

However, it is also possible for example, to apply the film II to the previously produced film I by in-line coating (melt extrusion).

When adhesives are used, these are applied to one surface of the film I and/or of the film II, using known methods, in particular by application from solutions or dispersions in water or in organic solvents. The solutions usually have an adhesive concentration of from 5.0 to 40.0% by weight, in order to give an amount of from 1.0 to 10.0 g/m² of adhesive on the film I and/or II.

Adhesives which have proven particularly advantageous are those composed of thermoplastic resins, such as cellulose esters and cellulose ethers, of alkyl esters and acrylic esters, of polyimides, of polyurethanes, or of polyesters, or of hot-curing resins, such as epoxy resins, urea-formaldehyde resins, phenol-formaldehyde resins, or melamin/formaldehyde resins, or of synthetic rubbers.

Examples of suitable solvents for the adhesive are hydrocarbons, such as ligroin and toluene, esters, such as ethyl acetate, or ketones, such as acetone and methyl ethyl ketone.

It was particularly surprising that despite the low PEN contents of the invention, even composites with thin PET/PEN copolymer films (e.g. 12 µm) protect the contents so effectively from spoiling under UV light that shelf life extensions of more than 100% are possible even without the use of additional UV absorbers.

The invention is further illustrated below using examples.

The following standards or methods were used here for measuring each of the properties.

Test Methods

Light transmittance (e.g. for UV transmittance)

Light transmittance is the ratio of total transmitted light to the quantity of incident light.

It is measured using "Hazegard plus" equipment to ASTM D 1003.

SV (DCA), IV (DCA)

Standard viscosity SV (DCA) is determined at 25° C. in dichloroacetic acid by a method based on DIN 53726. Intrinsic viscosity (IV) is calculated as follows from standard viscosity:

$$IV=[\eta]=6.907\cdot10^{-4}SV(DCA)+0.063096 [dl/g]$$

Yellowness Index

Yellowness Index YI is the difference from the colorless condition in the "yellow" direction and is measured to DIN 6167. Yellowness Index YI values of <5 are not visible.

Roughness

Film roughness $R_a$ was determined to DIN 4768 with a cut-off of 0.25 mm.

Melting Peak

The glass transition temperature $T_g$ was determined using film specimens with the aid of DSC (differential scanning calorimetry) (DIN 73 765). A DuPont DSC 1090 was used. The heating rate was 20 K/min, and the weight of specimen used was about 12 mg. The melting peak was determined in the first heating procedure. The maximum of the largest endothermic peak at from 180 to 280° C. was evaluated here as the melting peak.

Oxygen Barrier

The oxygen barrier was measured using a Mocon Modern Controls (USA) OX-TRAN 2/20 as in DIN 53 380, Part 3.

Shelf Life 200 g of boiled ham, in slices of diameter 10 cm and thickness 2.5 mm, were placed in the composite packaging using the inventive film, and the packaging was then sealed. A second composite packaging of the same type but using a commercially available PET film of the same thickness (in this case RNK from Mitsubishi Polyester Film Europe GmbH) is filled in the same way. Three packs of the UV-protected inventive composite and three packs using the commercially available PET film are then placed in an open chest refrigerator whose temperature is +3° C. 1 m above the packs (side with inventive film upward) there are 5 commercially available Phillips TL20W/05 neon tubes. The packs are (visually) checked daily for visible discoloration. The time to appearance of discoloration is noted, and the average (in hours) for the packs made from commercially available PET film is set at 100%. The percentage difference from this value is calculated for the inventive packs, the method being to divide the average (in hours) for occurrence of discoloration on these packs by the average of the packs made from commercially available PET film, the result being multiplied by 100. 100 is subtracted from the result.

Each of the examples and comparative examples below uses a single-layer transparent film of varying thickness.

Film Production

Thermoplastic chips for the base layer B were mixed in the ratios given in the examples and precrystallized in a fluidized-bed dryer at 155° C. for 1 min, then dried at 150° C. in a tower dryer for 3 h, and melted at 290° C. in a single-screw extruder. The thermoplastic chips for the outer layers A and, respectively, C were mixed in the ratios given in the examples and extruded at 290° C. in a twin-screw extruder. The molten polymer extrudates were combined in a coextrusion die and drawn off via a take-off roll. The film was stretched by a factor of 4.0 in the machine direction at 116° C. and by a factor of 3.9 transversely in a frame at 110° C. The film was then heat-set at 225° C. and relaxed transversely by 2% at temperatures of from 200 to 180° C.

Composite Production

From each of the films of the examples, three different composites were manufactured. For measurement of shelf life, the composite is sealed to a commercially available APET tray as substrate (on the side facing away from the UV light).

Composite A

Composite Film Using PE

The film from the example is coated with an adhesive (Adcote® 700 A+C from Rohm & Haas, Germany) in such a way that the weight of the adhesive layer formed was 0.5 g/m². A film of thickness 40 µm made from low-density polyethylene (Buklin® 40 μm from B&K, Germany) is then laminated onto the film of the example coated with adhesive (anchoring agent).

Composite B

Composite Film Using PP

The film from the example is coated with an adhesive (Adcote 700 A+C from Rohm & Haas, Germany) in such a way that the weight of the adhesive layer formed was 0.5 g/m². A sealable film of thickness 30 μm made from polypropylene (GND 30 from Trespaphan, Germany) is then laminated onto the film of the example coated with adhesive (anchoring agent).

Composite C

Composite Film Using PET

The film from the example is coated with an adhesive (Adcote 700 A+C from Rohm & Haas, Germany) in such a way that the weight of the adhesive layer formed was 0.5 g/m². A biaxially oriented sealable film of thickness 20 μm made from PET (Hostaphan® RHS 20 from Mitsubishi Polyester Film GmbH, Wiesbaden, Germany) is then laminated onto the film of the example coated with adhesive (anchoring agent). When a sealable inventive film is used this replaces the RHS film as sealable film. In this case the non-sealable film RNK 12 (Mitsubishi Polyester Film GmbH, Wiesbaden, Germany) serves as PET film.

EXAMPLES

Commercially available packaging films from Mitsubishi Polyester Film GmbH (Germany) were used as comparative for shelf life improvement.

Example 1

A transparent, single-side sealable film of thickness 19 μm is produced.

The base layer has a thickness of 15 mm and each of the outer layers A and C has a thickness of 2 μm.

Mixture for base layer B:

| | | |
|---|---|---|
| R1: | RT49 PET from KoSa (Offenbach, Germany), SV = 800 | 50% by weight |
| R2: | PET/PEN film regrind with 10% PEN content, SV = 700, IPA content = 4% | 50% by weight |

Mixture for sealable outer layer A:

| | | |
|---|---|---|
| R3: | PET, SV = 800, comprising 5 000 ppm of Sylysia ® 320 (Fuji, Japan; $d_{50}$ = 2.4 μm) and 7 000 ppm of Aerosil ® TT600 (Degussa/Germany) | 1% by weight |
| R4: | PET, SV = 800, with 70 mol % of ethylene terephthalate and 30 mol % of ethylene isophthalate | 69% by weight |
| R5: | 100% PEN, SV = 650 | 10% by weight |
| R2: | see above | 20% by weight |

Mixture for outer layer C:

| | | |
|---|---|---|
| R1: | see above | 85% by weight |
| R3: | see above | 15% by weight |

Oxygen barrier=60 $\{cm^3/(m^2 \cdot d \cdot bar)\} \cdot \{19\ \mu m/12\ \mu m\}$ Shelf life rise in % compared with a similar composite using RHS 19 film (Mitsubishi Polyester Film GmbH, Wiesbaden, Germany):

| | |
|---|---|
| Composite A: | 55% |
| Composite B: | 63% |
| Composite C: | 40% |

Example 2

A transparent film of thickness 12 μm is produced. The base layer has a thickness of 9 μm, and each of the outer layers A and A' has a thickness of 1.5 μm.

Mixture for base layer B:

| | | |
|---|---|---|
| R1: | RT49 PET from KoSa, SV = 800 | 42% by weight |
| R6: | PET/PEN film regrind with 90% PET and 10% PEN content, SV = 700, ash = 0.1% | 50% by weight |
| R5: | see above | 8% by weight |

Mixture for outer layers A + A':

| | | |
|---|---|---|
| R1: | see above | 94% by weight |
| R3: | see above | 6% by weight |

Oxygen barrier=93 $\{cm^3/(m^2 \cdot d \cdot bar)\} \cdot \{12\ \mu m/12\ \mu m\}$ Shelf life rise in % compared with a similar composite using RNK 12 film (Mitsubishi Polyester Film GmbH, Wiesbaden, Germany):

| | |
|---|---|
| Composite A: | 59% |
| Composite B: | 100% |
| Composite C: | 55% |

The invention claimed is:

1. An at least two-layered polyester film with a total thickness of from about 5 to about 200 μm which comprises a base layer and at least one polyethylene naphthahtte (PEN)-free outer layer, said film comprising, alongside polyethylene terephthalate, from anout 2 to about 20% by weight—based of on the weight of the entire film—of PEN, wherein (i) said base layer comprises PEN and (ii) at least one PEN-free outer layer comprises less than 0.1% by weight of PEN (based on the weight of this outer layer), and the polyethylene naphthalate content in each layer does not exceed 25% by weight, said films having a transmittance at 330 nm of less than 25%, said PEN-free outer layer reducing the blue fluorescence exhibited by said film in ultraviolet light in comparison to a comparable flim that lacks said PEN-free outer layer, wherein said film exhibits an oxygen barrier of less than 110 $\{cm^3/(m^2\ d\ bar)\} \cdot \{$film thickness [μm]/12 [μm ]$\}$ in the absence of an additional barrier layer and said film contains no additional UV absorber.

2. The film as claimed in claim 1, wherein said film has a melting peak at from about 230 to about 270° C. and diethylene glycol content of less than 3% by weight, said film exhibits an oxygen barrier of less than 100 $\{cm^3/(m^2\ d\ bar)\} \cdot \{$film thickness [μm]/12 [μm]$\}$ in the absence of an additional barrier layer and said film is co-extruded.

3. The film as claimed in claim 1, wherein the concentration of polyetylene napthalate is at least 5% by weight (based on the weight of the entire film), said film exhibits an oxygen barrier of less than 100 $\{cm^3/(m^2\ d\ bar)\} \cdot \{$film thickness [μm]/12[μm]} in the absence of an additional barrier layer and said film is co-extruded.

4. The film as claimed in claim 1, which comprises from about 0.5 to about 2.5% by weight of isophthalic acid (IPA) (based on the weight of the entire film), said film exhibiting a 2 to 5% lower oxygen barrier than provided by a comparable film without IPA.

5. The film as claimed in claim 1, which is composed of a polyethylene-naphthalate-containing base layer (B) and of an outer layer (A) with less than 0.1% by weight of PEN.

6. The film as claimed in claim 1, which is composed of a polyethylene-naphthalate-containing base layer (B) and of an outer layer (A) with less than 0.1% by weight of PEN, and of another outer layer (C) on that side of the base layer opposite to (A).

7. The film as claimed in claim 6, wherein the outer layer (C) has an additional functionality.

8. A process for producing a film as claimed in claim 1, where the melts corresponding to the individual layers of the film are coextruded through a flat-film die, the resultant prefilm is drawn off for solidification on one or more rolls, the perfilm is then biaxially stretched, and the biaxially stretched film is heat-set.

9. A packaging composite made from a film as claimed in claim 1 and from another film.

10. The packaging composite as claimed in claim 9, wherein the other film is a polyester film, polyamide film, polyethylene film, or polypropylene film.

11. An at least two-layered polyester film according to claim 1 said film comprising from 8 to about 20% by weight—based on the weight of the entire film—of PEN and exhibiting an oxygen barrier of less than 100 {cm$^3$/(m$^2$ d bar)}·{film thickness [μm]/12 [μm]}in the absence of an additional barrier layer.

12. An at least two-layered polyester film with a total thickness of from about 5 to about 200 μm which comprises, alongside polyethylene terephthalate, from about 5 to about 20% by weight—based on the weight of the entire film—of polyethylene naphthalate (PEN), wherein at least on PEN-free outer layer comprises less than 0.1% by weight of PEN (based on the weight of this outer layer), and the polyethylene naphthalate content in each layer does not exceed 25% by weight, said films having a transmittance at 330 nm of less than 25%, which is composed of a polyethylene-naphthalate-containing base layer (B) and two outer layers (A) and (A), or (A) and (A'), each with less than 0.1% by weight of PEN, said PEN-free outer layer reducing the blue fluorescence exhibited by said film in ultraviolet light in comparison to a comparable film that lacks said PEN-free outer layer,
wherein said PEN-free outer layer reduces said blue fluorescence in the absence of an additional UV absorber.

13. Method of absorbing UV radiation in a multilayer pakaging composite, which method comprises incorporating an at least two-layered polyester film with a total thickness of from about 5 to about 200 μm within said composite, said film including at least one outer layer and base layer, wherein at least one of said outer layers is a polyethylene naphthalate (PEN)-free layer comprising less than 0.1% by weight of polyethylene naphthalate and said base layer comprising from 5 to 25% by weight of polyethylene naphthalate, said film having a transmittance at 330 nm of less than 25% and said PEN-free outer layer reducing the blue fluorescence exhibited by said film in ultraviolet light in comparison to a comparable film that lacks said PEN-free outer layer,
wherein said PEN-free outer layer reduces said blue fluorescence in the absence of an additional UV absorber.

14. An at least two-layered polyester film comprising a first and second layer,
said first layer an outermost surface of said film, said first layer, a polyethylene naphthalate (PEN)-free layer, comprising less than 1.0% by weight of polyethylene, based on the weight of the layer,
said second layer comprising from 3 to 8% by weight of polyethylene naphthalate, based on the weight of the layer,
said film having a thickness ranging from 50 to 200 microns and exhibiting a transmittance at 330 nm of less than 25%, said PEN-free outer layer reducing the blue fluorescence exhibited by said film in ultraviolet light in comparison to a comparable film that lacks said PEN-free outer layer in the absence of an additional UV absorber.

15. An at least two-layered polyester film comprising a first and second layer,
said first layer forming an outermost surface of said film, said first layer, a polyethylene naphthalate (PEN)-free layer, comprising less than 0.1% by weight of polyethylene naphthalate, based on the weight of the layer,
said second layer comprising from 5 to 16% by weight of polyethylene naphthalate, based on the weight of the layer,
said film having a thickness ranging from 8 to 24 microns and exhibiting a transmittance at 330 nm of less than 25% in the absence of an additional UV absorber, said PEN-free outer layer reducing the blue fluorescence exhibited by said film in ultraviolet light in comparison to a comparable film that lacks said PEN-free outer layer.

16. An at least two-layered polyester film comprising a first and second layer,
said first layer forming an outermost surface of said film, said first layer, a polyethylene naphthalate (PEN)-free layer, comprising less than 0.1% by weight of polyethylene naphthalare,
said second layer comprising from 5 to 25% by weight of polyethylene naphthalate along with polyester comprising from 0.5 to 2.5% by weight isophthalic acid,
said film exhibiting a trasmittance at 330 nm of less than 25% in the absence of an additional UV absorber, said PEN-free Outer layer reducing the blue fluorescence exhibited by said film in ultraviolet light in comparison to a comparable film that lacks said PEN-free outer layer.

* * * * *